(12) United States Patent
Axelsson et al.

(10) Patent No.: US 7,965,038 B2
(45) Date of Patent: Jun. 21, 2011

(54) CATHODE SCREEN ADAPTED TO A COMPACT FLUORESCENT LAMP

(75) Inventors: Folke Axelsson, Ramdala (SE); Mikael Severinsson, Rodeby (SE)

(73) Assignee: Auralight International AB, Karlskrona (SE)

( * ) Notice: Subject to any disclaimer, the term of this patent is extended or adjusted under 35 U.S.C. 154(b) by 313 days.

(21) Appl. No.: 11/698,305

(22) Filed: Jan. 25, 2007

(65) Prior Publication Data
US 2007/0194682 A1    Aug. 23, 2007

(30) Foreign Application Priority Data

Jan. 25, 2006  (SE) ..................................... 6001598

(51) Int. Cl.
*H01J 1/00* (2006.01)
*H01J 1/52* (2006.01)

(52) U.S. Cl. ........ 313/567; 313/238; 313/239; 313/240; 313/242; 313/271

(58) Field of Classification Search .................. None
See application file for complete search history.

(56) References Cited

U.S. PATENT DOCUMENTS

| | | | |
|---|---|---|---|
| 3,482,141 A | 12/1969 | Greber | |
| 4,891,551 A | 1/1990 | Will | |
| 4,952,187 A | 8/1990 | Ake | |
| 5,004,949 A | 4/1991 | Latassa | |
| 5,006,755 A | 4/1991 | Wittmann et al. | |
| 6,630,787 B2 * | 10/2003 | Van Der Pol et al. | 313/574 |
| 6,646,365 B1 * | 11/2003 | Denissen et al. | 313/238 |
| 7,394,199 B2 * | 7/2008 | Axelsson et al. | 313/632 |
| 2008/0197776 A1 * | 8/2008 | Nozaki | 313/629 |

FOREIGN PATENT DOCUMENTS

| | | |
|---|---|---|
| EP | 0 203 246 | 12/1986 |
| EP | 0 555 619 | 8/1993 |
| JP | 61047052 | 3/1986 |
| WO | WO 03/088307 | 10/2003 |

OTHER PUBLICATIONS

EPO Search Report for EP App. No. 07 446 001.5, dated Apr. 6, 2007, 6 pages.

* cited by examiner

*Primary Examiner* — Nimeshkumar D Patel
*Assistant Examiner* — Natalie K Walford
(74) *Attorney, Agent, or Firm* — Albihns.Zacco AB

(57) ABSTRACT

Compact fluorescent lamp comprising a fluorescent lamp body (3), a cathode space (9) comprising a screened space (11) around an electrode (5) arranged inside the compact fluorescent lamp (1), and a power supply device (19) so arranged as to provide an electrical connection between the electrode (5) and a contact device (21) positioned next to the contact end (13) of the compact fluorescent lamp. The screened space (11) is formed by the electrode (5) enclosing the internal wall (7) of the fluorescent lamp body (3) and by a neighboring electrode (5) and beyond it a disc-shaped cathode screen (15) in a direction away from the contact end (13) containing a central opening (17).

13 Claims, 2 Drawing Sheets

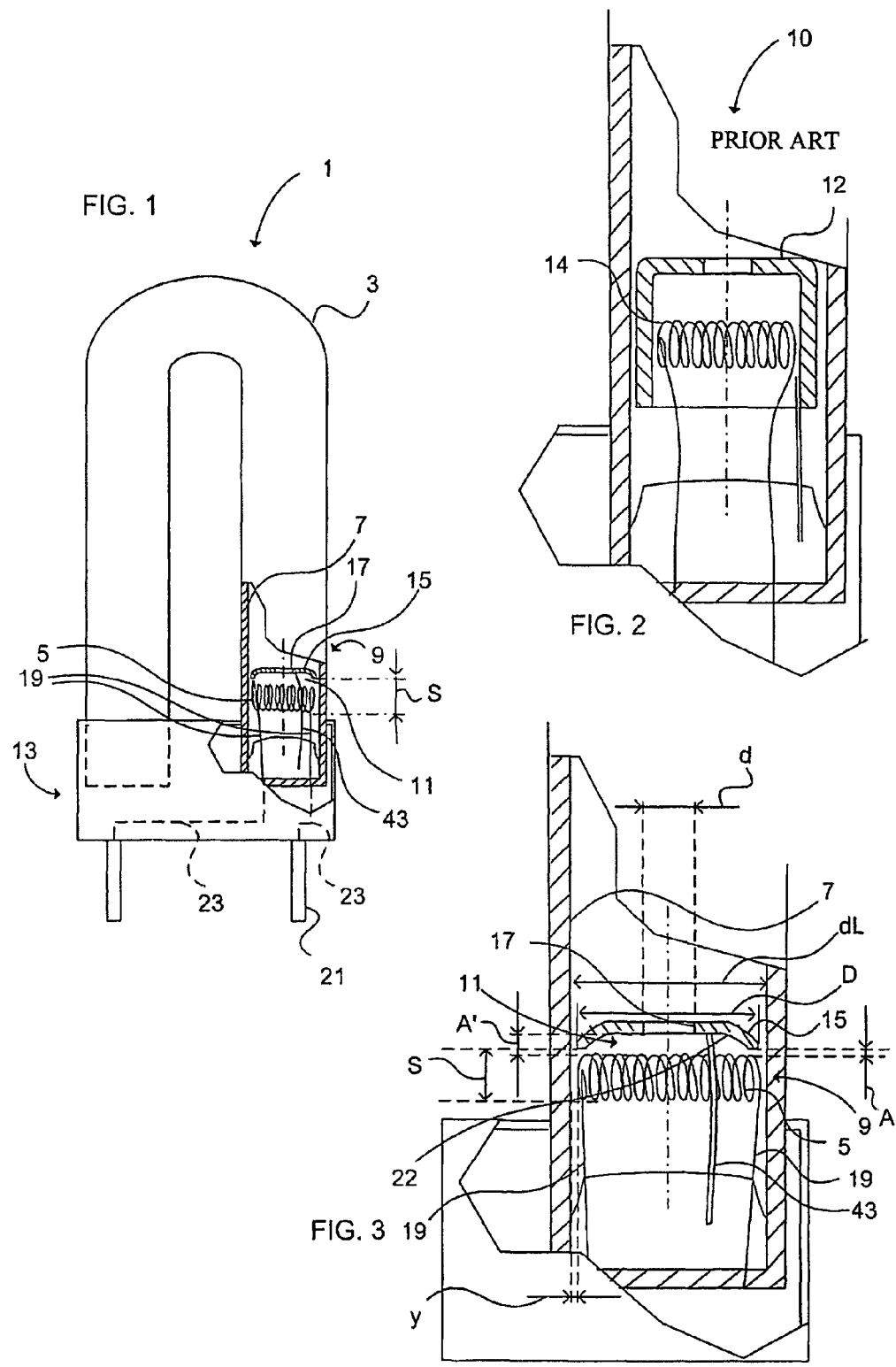

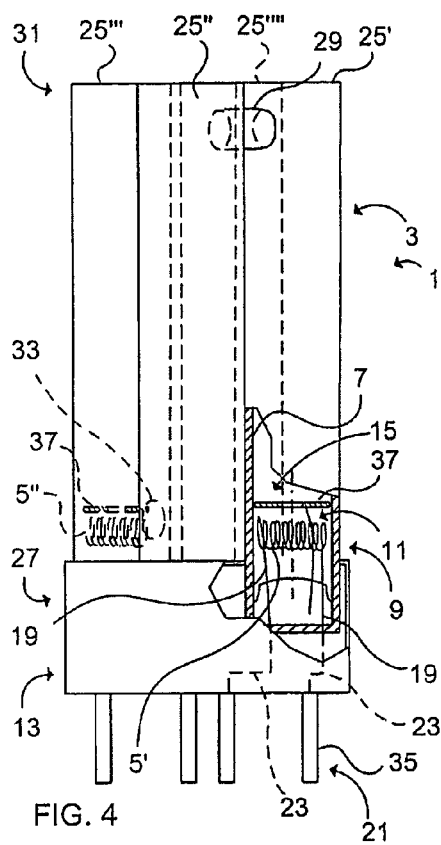
FIG. 4
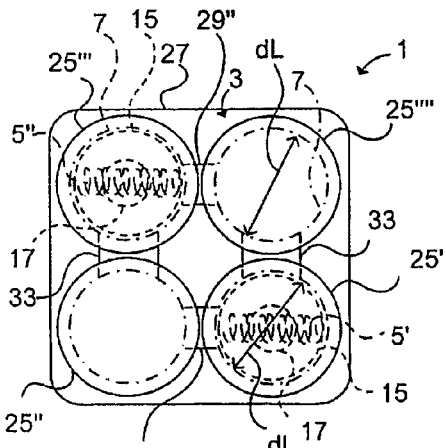
FIG. 5
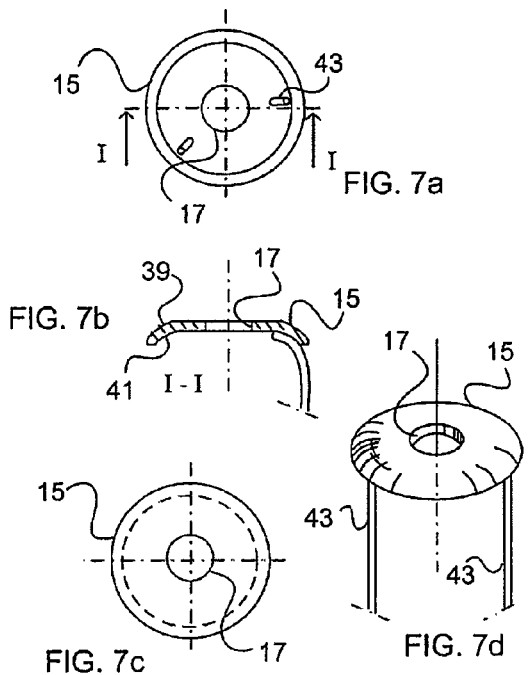
FIG. 7a
FIG. 7b
FIG. 7c
FIG. 7d
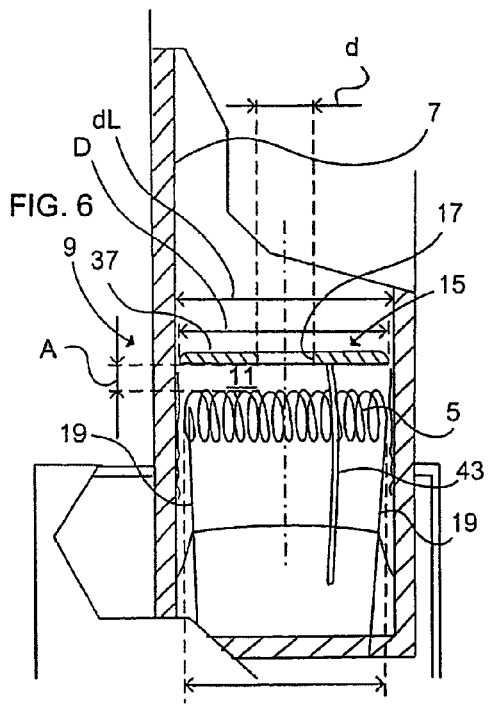
FIG. 6

CATHODE SCREEN ADAPTED TO A COMPACT FLUORESCENT LAMP

RELATED APPLICATION

This application claims priority under 35 U.S.C. 119 to Sweden Application No. 0600159-8, filed Jan. 25, 2006, which application is incorporated herein by reference and made a part hereof.

TECHNICAL FIELD

The present invention relates to a compact fluorescent lamp. The present invention relates in particular to compact fluorescent lamps of the low-frequency and high-frequency type that are so arranged as to be capable of generating the greatest possible quantity of light, while ensuring that the compact fluorescent lamp can be made as compact as possible, at the same time as the service life of the compact fluorescent lamp can be extended.

BACKGROUND ART

Already previously disclosed is the use of different types of cathode screens in compact fluorescent lamps with a view to obtaining various benefits and achieving an extended service life. The compact fluorescent lamp described in U.S. Pat. No. 4,952,187 offers a proposed solution as to how the service life can be further extended. This compact fluorescent lamp comprises spaces produced by constrictions of the fluorescent lamp body around the electrodes. Inside these spaces, emission materials are kept concentrated so that they fall back onto the electrode surface of the electrode in conjunction with phase shifting. This constriction (narrowing) is associated with a small negative space charge, whereby the released ions remain inside the space and are able to fall back onto the electrode surface. It has been found that the electron concentration increases when the electrode functions as an anode, that the anode fall is reduced, and that the temperature and rate of vaporization of the emission material are lowered, which brings an increased service life.

Compact fluorescent lamps produce a lot of light in relation to their size and also have a high discharge current and high cathode wear in relation to their external geometry. Because of the compact dimensions of the compact fluorescent lamps, this presents difficulties in finding sufficient space for bulky electrodes/cathodes. This means that it is difficult to achieve a long service life.

One problem associated with previously disclosed compact fluorescent lamps, however, is that the cathode space in these does not permit the use of larger electrodes in order to achieve a longer service life. Likewise, previously disclosed compact fluorescent lamps with a constricted tube body are associated with an uneconomical production process.

The applicants for the present invention currently produce and sell fluorescent lamps, which in most cases are powered at high frequency. The fluorescent lamps comprise a cathode space in accordance with Swedish patent SE 542 397. The cathode space according to this patent is formed by a cathode screen in the form of a cup, which is insulated from an electrode contained in the cathode space. Fluorescent lamps of this kind contain two cathode spaces, that is to say two electrodes which operate alternately as cathodes and anodes respectively. The service life of the electrode is limited by the vaporization and sputtering (atomization) of emitter material from the "hot point" of the electrode. This "hot point" derives its heat in the first instance from the ohmic heating and the kinetic energy of incident positive ions. Electron emission takes place from this point. Vaporization and sputtering of emitter material from the hot point means that ionized barium, strontium and calcium will be present at their highest concentration in the immediate vicinity of, and a few millimetres from the "hot point". The object of the cathode screen is to increase the concentration of positive ions and in particular the ionized emitter material in the immediate vicinity of the "hot point" of the electrode.

The cathode space described in SE 542 397 functions very satisfactorily and is accordingly used in fluorescent lamps of the high-frequency type, although a further development of the same according to an embodiment of the present invention has brought with it improvements in respect of the adaptation of the cathode space for compact fluorescent lamps.

One aspect of the present invention is to make available a compact fluorescent lamp, which overcomes the disadvantages associated with the prior art and is a further development of, and an improvement to the compact fluorescent lamp described in U.S. Pat. No. 4,952,187.

The above-mentioned problem has been solved with the help of the compact fluorescent lamp described herein. One example includes a screened space formed by an internal wall of the fluorescent lamp body enclosing the electrode and by adjacent the electrode and beyond it in a direction away from a contact end, a disc-shaped cathode screen, containing a central opening. Other purposes and advantages can be appreciated from the accompanying disclosure including the drawings.

The compact fluorescent lamp can thus be made to take up as little space as possible, at the same time as appropriate conditions are created for imparting a long service life to the compact fluorescent lamp. The electrode can be made larger by means of the indicated distinctive features, in conjunction with which a larger quantity of emitter material can be applied to the electrode. All types of compact fluorescent lamp appropriately include two electrodes at the foot part of the fluorescent lamp body or bodies, and a disc-shaped cathode screen is appropriately arranged next to both electrodes. Compact fluorescent lamps can be of the type with 2, 4 or 6 bars and 2 or 4 pins for electrical connection. By the expedient of causing the electrode to correspond essentially to the average internal diameter of the fluorescent lamp body, although with a slightly smaller extent (so that electrical contact does not occur), the electrode can be executed so that it is larger and/or longer than permitted by the prior art, as a consequence of which its service life can be extended at the same time as the internal diameter of the fluorescent lamp body is retained, but without the compact fluorescent lamp itself needing to be made larger. Likewise, the manufacture of the compact fluorescent lamp can be achieved in an economical manner, because there is no longer a requirement for constriction of the fluorescent lamp body to be performed in a complicated stage of the manufacturing process.

A second electrode is so arranged that it is screened by means of a second, disc-shaped cathode screen, in an embodiment.

Alternatively, the distance between the electrode and the cathode screen is the smallest possible without causing contact to occur.

The cathode screen can thus be electrically insulated from the electrode, and the functionality can be maintained. The area closest to the electrode in the cathode space exhibits the highest concentration of ionized emitter material. The service life of the electrode is increased by the return migration of vaporized emission material that takes place from the screened space. Ionized barium and strontium atoms become electrically charged and are attracted back to the negatively charged cathode. The screened space is formed by the underside of the disc-shaped cathode screen and the internal wall of the fluorescent lamp body (its internal wall around the electrode essentially from the position of the electrode to the disc-shaped cathode screen).

The distance between the electrode and the disc-shaped cathode screen is appropriately 4-8 mm, and preferably 5-7 mm.

The distance between the electrode and the internal wall of the fluorescent lamp body is appropriately 1-4 mm, and preferably 2-3 mm.

This means that ionized emitter material is present at its highest concentration in the immediate vicinity of, and for a few millimetres outwards from the hot point. The electrode is provided with emitter material, which possesses the ability to emit electrons in the presence of a moderate temperature and energy supply. The emitter material contains alkali oxides. The service life of the electrode is limited by the vaporization and sputtering of emitter material from the "hot point" of the electrode. The hot point of the electrode obtains its heat primarily from the electrical heating and the kinetic energy of incident positive ions. The electron emission takes place from this hot point of the electrode. It has been shown by experiment that the disc-shaped cathode screen together with the internal wall of the fluorescent lamp body, that is to say the wall area that encloses the electrode as far as the disc-shaped cathode screen, increases the concentration of positive ions and in particular the ionized emitter material in the immediate vicinity of the hot point of the electrode, that is to say when the distance between the electrode and the disc-shaped cathode screen is 4-8 mm, and preferably 5-7 mm.

The disc-shaped cathode screen preferably has an extent essentially corresponding to the internal cross-sectional area of the fluorescent lamp body, viewed in a plane perpendicular to the essential longitudinal direction of the fluorescent lamp body within the area of the cathode space, but without coming into electrical contact with the fluorescent lamp body. The disc-shaped cathode screen is supported by a support device (such as a metal stay fused into a foot) and is electrically insulated from the electrode.

In this way, the underside of the disc-shaped cathode screen together with the internal wall of the fluorescent lamp body, that is to say the wall area that encloses the electrode as far as the disc-shaped cathode screen, forms a screened space.

Alternatively, the central opening has a diameter of 4-8 mm, and preferably 5-7 mm.

The central opening through the cathode screen brings about a "compression" of the fluorescent lamp plasma with increased current concentration/electron concentration. The increased current concentration in the vicinity of the cathode increases the chance of vaporized emitter material being ionized in the immediate vicinity of the cathode, which in turn gives an improved "return migration" of emitter material to the cathode. The increase in the current concentration adjacent to the hot point of the cathode also reduces the cathode voltage drop and the wear/heating caused by incident positive ions to a certain extent. One consequence of the "compression" of the fluorescent lamp plasma is that the presence of ions (ionized emitter material) and, for example, mercury outside the cathode screen, for example 10 mm from the electrode, will also be reduced steeply in comparison with a design without a cathode screen.

The side of the disc-shaped cathode screen facing away from the electrode appropriately exhibits a rounded area.

Assembly of the disc-shaped cathode screen can take place more rapidly in this way, and can be performed by automatic means, since the introduction of this into the fluorescent lamp body is simplified at the same time as the risk of damage to the layers of luminescent powder on the internal wall of the fluorescent lamp body in conjunction with its introduction is reduced.

The side of the disc-shaped cathode screen facing towards the electrode preferably exhibits a concave surface.

The rounded area produced on the other side can thus be utilized as a concave surface facing towards the electrode. This simplifies manufacture, because a flat metal blank can be stamped out to the desired form, thereby producing both the rounded area and the concave surface, which concave surface helps to prevent the fluorescent lamp plasma and the current transport through the fluorescent lamp gas from passing close to the internal wall of the fluorescent lamp body, on the outside of the cathode screen, and in so doing from being concentrated into the central opening of the cathode screen.

Alternatively, the disc-shaped cathode screen is made of metal.

The metal is iron in an embodiment. A disc-shaped cathode screen, which has an almost non-existent tendency to react with the components of the fluorescent lamp atmosphere, has thus been produced in this way, in conjunction with which chemical impurities, the effect of which could be to impair the function of the emitter material in the cathode space, are avoided. The disc-shaped cathode screen can appropriately be manufactured in a single piece and in a single operation by means of the pressing/stamping of a metal blank, such as iron, nickel, etc.

The disc-shaped cathode screen is appropriately supported by a support device that is electrically insulated from the electrode.

The disc-shaped cathode screen can be made insulated in this way.

Alternatively, the disc-shaped cathode screen is supported by at least two support devices that are electrically insulated from the electrode.

This ensures that the disc-shaped cathode screen is retained in a central position in the fluorescent lamp body without coming into contact with the internal wall of the fluorescent lamp body and any layer of luminescent powder applied thereto (luminescent material layer). Likewise, the disc-shaped cathode screen can be executed in this way with an optimal extent in relation to the internal diameter of the fluorescent lamp body.

BRIEF DESCRIPTION OF DRAWINGS

The present invention is described below in greater detail with reference to the accompanying drawings, in which schematically:

FIG. 1 depicts a compact fluorescent lamp according to a first illustrative embodiment;

FIG. 2 depicts a cathode screen according to the prior art;

FIG. 3 depicts the disc-shaped cathode screen in FIG. 1 in an enlarged view;

FIG. 4 depicts a compact fluorescent lamp according to a second illustrative embodiment;

FIG. 5 depicts the compact fluorescent lamp in FIG. 4 viewed from above;

FIG. 6 depicts the cathode screen in FIG. 4 in an enlarged view; and

FIGS. 7a-7d depict different views of the disc-shaped cathode screen in FIG. 3.

DESCRIPTION

The present invention is described below as illustrative embodiments. In the interests of greater clarity, components of no significance to the invention have been omitted from the drawing. Where the same details are illustrated in several figures, these may lack a reference designation in certain cases, although they will correspond to those which have a reference designation.

FIG. 1 depicts schematically a compact fluorescent lamp 1 according to a first embodiment. The depicted compact fluorescent lamp 1 is constructed from a fluorescent lamp body 3 having two electrodes 5 at either end (only one electrode is shown). The compact fluorescent lamp 1 thus comprises the fluorescent lamp body 3 executed as a curved tubular body made of glass. The internal wall 7 of the fluorescent lamp body 3 has a coating consisting of a light-emitting material/layer (luminescent layer/luminescent material layer) (not shown). The electrodes 5 have a coating consisting of an electron-emitting material (a so-called emitter material). A cathode space 9 is so arranged as to comprise a screened space 11 around each electrode 5 arranged in the compact fluorescent lamp 1, forming a cathode. This screened space 11 is produced by the internal wall 7 of the fluorescent lamp body, which encloses the electrode 5 along its length S, and a disc-shaped cathode screen 15 comprising a central opening 17 adjacent to the electrode 5 and having its largest surface situated essentially beyond the electrode 5 in the direction away from a contact end 13, together forming the screened space 11. The disc-shaped cathode screen 15 is supported by a support device 43 in the form of a metal stay. The central opening 17 through the cathode screen 15 brings about a "compression" of the fluorescent lamp plasma with increased current concentration/electron concentration. The increased current concentration in the vicinity of the cathode increases the chance of vaporized emitter material being ionized in the immediate vicinity of the cathode, which in turn gives an improved "return migration" of emitter material to the cathode. One consequence of the "compression" of the fluorescent lamp plasma is that the presence of ions (ionized emitter material) and, for example, mercury present outside the cathode screen, for example 10 mm from the electrode, will also be reduced steeply in comparison with a design without a cathode screen.

By causing the internal wall 7 of the fluorescent lamp body 3 of the compact fluorescent lamp 1 and the disc-shaped cathode screen 15 to interact so as to form the cathode space 9, the electrode 5 can be made larger (longer) compared with the prior art (see FIG. 2), as a consequence of which a larger quantity of emitter material (not shown) can be applied to the electrode 5. The service life of the compact fluorescent lamp 1 can be extended in this way, at the same time as the internal diameter of the fluorescent lamp body 3 is retained, but without having to make the compact fluorescent lamp 1 larger. By the same rationale, the compact fluorescent lamp 1 can be made less bulky at the same time as its service life is maintained. Likewise, the manufacture of the compact fluorescent lamp 1 can be achieved in an economical manner in this way, because there is no requirement for constriction of the fluorescent lamp body 3 to be performed in a complicated stage of the manufacturing process. Such constriction can lead to cracking of the fluorescent lamp body, with the result that a large proportion of the fluorescent lamp bodies produced with constriction must be scrapped.

The compact fluorescent lamp 1 in FIG. 1 also comprises a power supply device 19 so arranged as to provide an electrical connection between the electrode 5 and a contact device 21 positioned next to the contact end 13. Wires 23 connect the contact device 21 and the power supply device 19.

Depicted in FIG. 2 is a cathode space 10 according to the prior art that is used in straight fluorescent lamps. A cathode screen 12 in the form of a cup constitutes the screened space. FIG. 2 clearly indicates that the length of the electrode 14 is less extensive than in the case of the cathode space 9 in FIG. 3, which is described in greater detail below. The electrode 14 indicated in FIG. 2 can thus be coated with a smaller quantity of emitter material than is the case for the embodiment illustrated in FIG. 1.

FIG. 3 illustrates the disc-shaped cathode screen 15 depicted in FIG. 1 in an enlarged view. In conjunction with FIG. 3, predetermined dimensions (arrived at in the course of experiments conducted by the applicants for the present patent application) are also described in greater detail in respect of the distance (A, A') between the electrode 5 and the disc-shaped cathode screen 15 (also including the distance y between the electrode 5 and the internal wall 7 of the fluorescent lamp body), and in respect of the extent of the disc-shaped cathode screen 15 in the fluorescent lamp body 3, and in respect of the diameter d of the central opening 17. The disc-shaped cathode screen 15 has an extent essentially corresponding to the internal cross-sectional area of the fluorescent lamp body 3, viewed in a plane perpendicular to the essential longitudinal direction of the fluorescent lamp body 3 within the area of the cathode space 9, but without coming into electrical contact with the fluorescent lamp body 3. The screened space is formed by the underside 22 of the disc-shaped cathode screen and the internal wall 7 of the fluorescent lamp body. It is advantageous for the distance between the electrode 5 and the cathode space 9 to be as small as possible without electrical contact occurring. In FIG. 3, the distance A' between the disc-shaped cathode screen 15 and the electrode 5 is preferably 6 mm when the internal diameter of the fluorescent lamp body is 15 mm. The distance A in this case is 3 mm. The diameter D of the disc-shaped cathode screen essentially corresponds to, and has a slightly smaller diameter than the internal diameter of the fluorescent lamp body 3 (or has a diameter D such that the disc-shaped cathode screen 15 does not come into contact with the luminescent layer that is applied to the internal wall 7 of the fluorescent lamp body 3). The diameter d of the central opening 17 is 3-8 mm, and preferably 5-7 mm, depending on the internal diameter dL of the fluorescent lamp body 3.

The diameter of the central opening 17 is optimized having regard for a number of practical considerations: a) a very small central opening increases the tendency for recombination between electrons and ions and in that way increases the starting voltage, that is to say it makes the fluorescent lamp more difficult to start (it is necessary to take account of the starting capacity of the driving devices available on the market); b) a very small central opening likewise increases the likelihood that a conductive plasma will instead be formed in the space between the wall of the fluorescent lamp (the internal wall of the fluorescent lamp body) and the external wall of the cathode screen (a stable plasma can only be established along the "path which has the lowest voltage drop for the plasma"). The relatively high tendency for recombination between electrons and ions close to the internal wall nevertheless helps to counteract the occurrence of this undesired plasma at a point close to the internal wall (the internal wall of the tube). The distance between the cathode and the central opening is optimized in such a way that an increased concentration of the charge is maintained in the immediate vicinity of the cathode. A low and stable cathode voltage drop is produced in this way, at the same time as the function of the cathode is made stable and uniform throughout the entire service life of the fluorescent lamp (for all emitter-carrying parts of the electrode). The diameter of the cathode screen is likewise optimized. An excessively small diameter of the disc-shaped cathode screen can give rise to the presence of the aforementioned undesired plasma between the internal wall of the fluorescent lamp body and the cathode screen. The diameter D of the disc-shaped cathode screen 15 is thus selected so that plasma does not occur between the internal wall 7 and the cathode screen 15. Conversely, an excessively large diameter of the cathode screen 15 will impair the suitability for production and will, for example, increase the risk of the screen catching on the glass tube in conjunction with its introduction.

FIG. 4 depicts a compact fluorescent lamp 1 according to a second illustrative embodiment. The compact fluorescent lamp 1 is constructed from four rods 25'-25"" and comprises two electrodes 5', 5". The first electrode 5' is positioned on a foot part 27 (contact end 13) of a first rod 25' arranged for the fluorescent lamp body 3. A transition 29 next to an upper, second end 31 opposite the foot part 27 is so arranged as to provide open communication with a second rod 25". The upper, second end 31 is arranged for the control of the mercury vapour pressure. A third rod 25''' contains the second electrode 5" on the foot part 27, and a foot part transition 33 is arranged between the third rod 25''' and the second rod 25" in order to provide open communication between the electrode 5" of the third rod 25''' and the foot part 27 of the rod 25". A curved plasma column can be produced in this way from the first rod 25', through the transition 29 to the second rod 25". In the same way, a fourth rod 25"" is in communication with the foot part 27 of the first rod 25'. The fourth rod 25"" is connected to provide open communication with the third rod 25''' by means of a second transition 29" (see also the description in conjunction with FIG. 5 below) at the upper, second end 31. Four pins 35 are connected to provide electrical communication with the electrodes 5', 5". The disc-shaped cathode screen 15 is executed according to this illustrative embodiment as a flat disc 37 with a central opening 17. Manufacturing of the compact fluorescent lamp 1 is economical as a result, because manufacturing of the disc-shaped cathode screen 15 involves an uncomplicated procedure.

The compact fluorescent lamp according to this second illustrative embodiment can be made more compact than in the prior art, at the same time as the service life is increased.

FIG. 5 depicts the compact fluorescent lamp 1 in FIG. 4 viewed from above. The two electrodes 5', 5" that are screened by the disc-shaped cathode screens 15 are indicated by a broken line. The extent of the disc-shaped cathode screens 15 (indicated by a broken line) is clearly shown to correspond essentially to the internal diameter dL (dashed and dotted line) of the fluorescent lamp body 3 (and that of the rod 25). Transitions 29 between the corners of the rods are clearly indicated, and likewise the foot part transitions 33. FIG. 6 illustrates the cathode space 9 in FIG. 4. The internal diameter dL of the fluorescent lamp body in this case is 15 mm. The distance A is 6 mm. The disc-shaped cathode screen 15 has a diameter D of 11 mm. The diameter d of the central opening 17 is 6 mm. For an explanation of the reference designations, see also the earlier explanation in conjunction with FIG. 3.

FIG. 7a depicts the disc-shaped cathode screen 15 in FIG. 3 viewed from below. A sectioned view of the disc-shaped cathode screen 15 is depicted in FIG. 7b according to a cross section I-I in FIG. 7a. The side of the disc-shaped cathode screen 15 facing away from the electrode 5 is clearly shown to exhibit a rounded area 39. Assembly of the disc-shaped cathode screen 15 can take place more rapidly in this way, and can be performed by automatic means, since the introduction of this into the fluorescent lamp body 3 is simplified at the same time as the risk of layer of luminescent powder on the internal wall 7 of the fluorescent lamp body 3 being damaged in conjunction with its introduction is reduced. FIG. 7b also shows that the side of the disc-shaped cathode screen 15 facing towards the electrode 5 exhibits a concave surface 41. The rounded area 39 produced on the opposite side is used to form the concave surface 41 facing towards the electrode 5. This simplifies manufacturing of the disc-shaped cathode screen 15, because a flat metal blank can be stamped out to the desired form, thereby producing both the rounded area 39 and the concave surface 41, which concave surface 41 is advantageous for guiding the discharge plasma through the central opening 17. FIG. 7c shows the disc-shaped cathode screen 15 viewed from above, and FIG. 7d depicts this in a perspective view. The disc-shaped cathode screen 15 is supported by two support devices 43, in the form of two metal stays, electrically insulated from the electrode 5. This ensures that the disc-shaped cathode screen 15 is maintained in position centrally in the fluorescent lamp body 3 without coming into contact with the internal wall 7 of the fluorescent lamp body 3 and a layer of luminescent powder applied thereto. Likewise, the disc-shaped cathode screen 15 can be executed in this way with an optimal extent in relation to the internal diameter dL of the fluorescent lamp body.

The present invention must not be regarded as being restricted to the illustrative embodiments described above, but modifications and combinations of these are conceivable within the scope of the present invention. For example, the central opening can have a different form, such as elliptical or angular form. Cathode spaces can be arranged in compact fluorescent lamps with six rods. The disc-shaped cathode screen can be made of a material other than metal, for example glass or porcelain. The compact fluorescent lamp with the disc-shaped cathode screen described here can be made more compact, while maintaining its service life. The electrode can be provided with sufficient space enabling it to be longer or to exhibit a curve, according to the present invention, in conjunction with which an increased service life for the compact fluorescent lamp is likewise achieved according to the above rationale.

Embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The invention claimed is:

1. A compact fluorescent lamp comprising a fluorescent lamp body, a a screened space around an electrode arranged inside the compact fluorescent lamp, and a power supply device arranged to provide an electrical connection between the electrode and a contact device positioned next to the contact end of the compact fluorescent lamp, the screened space being formed by an internal wall of the fluorescent lamp body enclosing the electrode and by the electrode and beyond the electrode, in a direction away from the contact end, a disc-shaped cathode screen, containing a central opening wherein the side of the disc-shaped cathode screen facing away from the electrode exhibits a rounded area, and wherein the side of the disc-shaped cathode screen facing towards the electrode exhibits a concave surface, wherein that the disc-shaped cathode screen includes an extent essentially corresponding to the internal cross-sectional area of the fluorescent lamp body, viewed in a plane perpendicular to the essential longitudinal direction of the fluorescent lamp body but without coming into contact with the fluorescent lamp.

2. The compact fluorescent lamp according to claim 1, wherein a second electrode is screened by means of a second disc-shaped cathode screen on the fluorescent lamp body.

3. The compact fluorescent lamp according to claim 1, wherein the distance between the electrode and the disc-shaped cathode screen is 4-8 mm.

4. The compact fluorescent lamp according to claim 1, wherein the central opening has a diameter of 4-8 mm.

5. The compact fluorescent lamp according to claim 1, wherein the disc-shaped cathode screen is made of metal.

6. The compact fluorescent lamp according to claim 1, wherein that the disc-shaped cathode screen is supported by a support device that is electrically insulated from the electrode.

7. The compact fluorescent lamp according to claim 1, wherein that the disc-shaped cathode screen is supported by at least two support devices that are electrically insulated from the electrode.

8. The compact fluorescent lamp according to claim 1, wherein the distance between the electrode and the disc-shaped cathode screen is 5-7 mm.

9. The compact fluorescent lamp according to claim 8, wherein the central opening has a diameter of 4-8 mm.

10. The compact fluorescent lamp according to claim 1, wherein the central opening has a diameter of about 5-7 mm.

11. A compact fluorescent lamp, comprising: a contact end; a fluorescent lamp body coupled to the contact end, the fluorescent lamp body including an internal wall enclosing an interior that includes a cathode space and a screened space, an electrode positioned in the screened space of the interior of the fluorescent lamp body, an electrical connection in electrical communication with the electrode, and a disc-shaped cathode screen, containing a central opening, in the interior on a side of the electrode remote the contact end and wherein a first side of the disc-shaped cathode screen faces away from the electrode and includes a rounded area, and wherein a second side of the disc-shaped cathode screen faces towards the electrode and includes a concave surface.

12. The compact fluorescent lamp according to claim 11, wherein the interior of the fluorescent lamp body intermediate the internal wall and electrode is free from the cathode screen.

13. The compact fluorescent lamp according to claim 12, wherein the distance between the electrode and the disc-shaped cathode screen is 5-7 mm, and wherein the central opening has a diameter of 4-8 mm.

* * * * *